United States Patent [19]

Sinkkonen

[11] Patent Number: 5,110,067
[45] Date of Patent: May 5, 1992

[54] TRANSFER DEVICE TO GRIP A DOUBLE WHEEL

[75] Inventor: Matti Sinkkonen, Vaajakoski, Finland

[73] Assignee: Tana-Jyra Ky, Vaajakoski, Finland

[21] Appl. No.: 572,933
[22] PCT Filed: Mar. 8, 1989
[86] PCT No.: PCT/FI89/00040
§ 371 Date: Sep. 7, 1990
§ 102(e) Date: Sep. 7, 1990
[87] PCT Pub. No.: WO89/08583
PCT Pub. Date: Sep. 21, 1989

[30] Foreign Application Priority Data

Mar. 8, 1988 [FI] Finland ................. 881057

[51] Int. Cl.⁵ .............................................. B64C 25/50
[52] U.S. Cl. .................................... 244/50; 180/904; 414/429
[58] Field of Search ............... 244/50; 180/14.7, 904; 414/426–430

[56] References Cited

U.S. PATENT DOCUMENTS 4,632,625 12/1986 Schuller et al. ................ 180/904
4,810,157 3/1989 Schopf ............................. 414/429
4,950,121 8/1990 Meyer et al. .................... 244/50
4,997,331 3/1991 Grinsted et al. ................ 180/904

FOREIGN PATENT DOCUMENTS

87/06542 11/1987 PCT Int'l Appl. ............. 180/14.7

Primary Examiner—Sherman Basinger
Assistant Examiner—Christopher P. Ellis
Attorney, Agent, or Firm—Hale and Dorr

[57] ABSTRACT

The object of the invention is a transfer device that will grip double wheels of very different size, which is intended to move an aircraft (1) or other device equipped with double wheels on a base, which transfer device includes a fork-shaped frame and pairs of rollers (3, 4) attached to both forks (2), compression devices for them and devices to rotate the rollers, both pairs of which rollers (3, 4) being placed from the side in front and behind the wheel (6) of the device (1) to be moved. According to the invention the forks (2) are attached to the frame part (7) that connects them by means of parallelogram arms (5), which are adapted to provide the rollers (3, 4) with the lateral movement required when being placed around double wheels (6) and which transfer device includes operating devices (18) to turn the parallelogram arms.

14 Claims, 7 Drawing Sheets

TRANSFER DEVICE TO GRIP A DOUBLE WHEEL

BACKGROUND OF THE INVENTION

The invention relates generally to vehicles used to move aircraft on the ground, and more particularly to moving aircraft having a double wheel.

It is desirable to provide a transfer device that grips a double, and which is intended to move an aircraft or other device equipped with double wheels on a base, and which transfer device includes a fork-shaped frame and pairs of rollers located on each of the prongs of the fork and devices to revolve the rollers and devices to compress them, both pairs of rollers being able to be placed from the side in front and behind the wheel of the device to be moved, and in which by means of rotating the rollers pressed against the wheel, the wheel of the device to be moved is made to revolve and the entire device to move.

Here a double wheel also means the adjacent wheels of the wheels of a bogie. The transfer device is mainly intended to move passenger aircraft at an airport. Here the compression and friction rollers also mean sets of rollers formed by more than one roller close together. A track or similar apparatus may be used on top of the set of rollers.

The structure of a transfer device can be considerably lightened when the rotational force is transferred to the aircraft's own wheel from the operating wheels or friction rollers that form part of the transfer device. An entirely universally applicable light transfer device's construction is shown in Finnish Patent Application FI 833275 (partly corresponding to WO85/01265). This requires no contact with the bogie of the aircraft in order to press the drive wheel against the wheel of the aircraft. The compression is achieved by means of the mutual movement of the pressure rollers, connected by an intermediate device, which are placed around the wheel of the aircraft.

A transfer device, which grips a double wheel, especially the front undercarriage bogie of an aircraft, is shown in U.S. Pat. No. 3,005,510. In it the neighbouring bogie wheels are used by means of two friction tracks, which are wedged between consecutive bogie wheels. In the known transfer devices that grip double wheels the problem is that they can only be used with some types of aircraft. The dimensions of double wheels in different aircraft vary greatly. The smallest wheel sizes have a diameter of only 80 cm, whereas the largest diameter is a large as 2 m. An even greater problem than this is the wide range of dimensions between the wheels. In the smallest aircraft the distance between the tracks of the wheels is only 80 cm and in the largest 1400 cm. In this case a transfer device with a U-shaped frame must be made very wide and the lateral adjustment of the rollers very long. Transfer devices with a U-frame are shown in, among others, WO publications 87/06542 (PCT/FI87/53).

OBJECTS OF THE INVENTION

An object of this invention is to achieve a transfer device that rotates double wheels and which can be used with double and bogie wheels of varying size.

SUMMARY OF THE INVENTION

The characteristics of the invention appear in the accompanying Patent claims. The main principle of the invention is to carry out the lateral movement of the rollers either entirely or partly by moveing the side forks in their entirety by means of parallelogram arms. Firstly, these keep the forks always parallel and secondly, the torque created by the compression is led through them to the rear frame, where the forces cancel out. In a preferred embodiment only the adjustment required by the width of the double wheels of different aircraft is carried out by the lateral movement of the parallelogram arms. In this case the overall width of the device remains small. The change in position of the front rollers and the compression movement can be achieved in some known manner.

In another preferred embodiment, the forks always turn in the same relation to the frame part. By means of a further preferred embodiment the problem of the locking of the front support wheels can be solved. These have to turn freely during the transfer of an aircraft, but should be locked when the transfer device itself is moved, when steering takes place with the rear wheels.

The form of application shown in patent claim 6 makes possible the maximum pushing and pulling ability. The optimum locations of the carrier wheels are at different places in pushing and pulling.

In what follows the invention is illustrated with the aid of examples by reference to the accompanying illustrations, which show various forms of application of the invention.

DETAILED DESCRIPTION OF PREFERRED EMBODIMENT OF THE INVENTION

Figure 1:
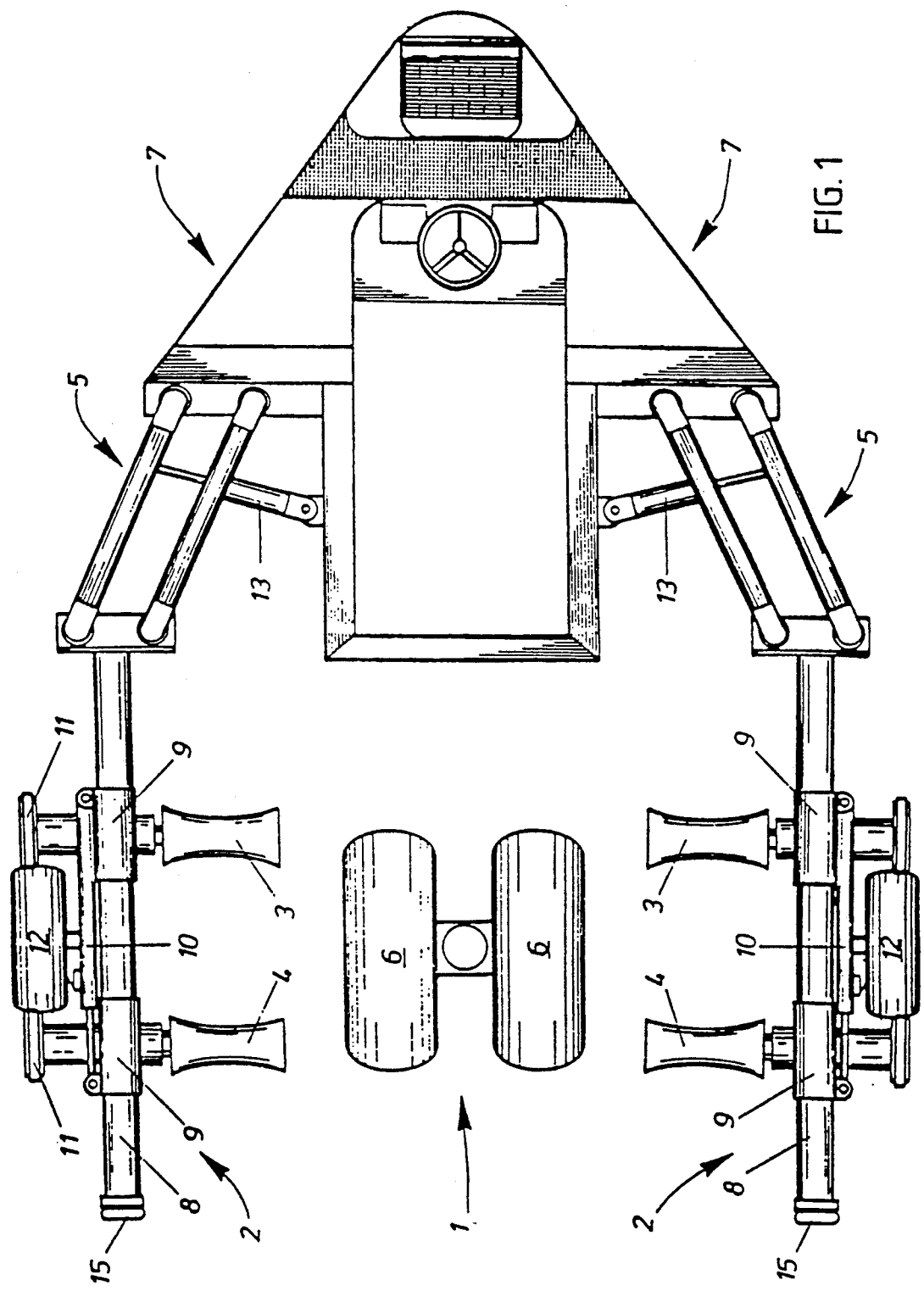
FIG. 1 shows the transfer device being driven around a double wheel, seen from in front

The transfer devices shown in FIGS. 1 through 7 are intended to move an aircraft 1 on an airfield. In the figures the aircraft 1 is shown by only a part of the landing gear and the wheels 6. The transfer device moves to the aircraft pulled by its front support wheels 12. In addition to those its principal components are the friction rollers 3 and 4, which are supported by the front forks, their compression and rotation equipment, the power device unit, the parallelogram arms 5, the rear frame 7 and the steering device that turns the rear wheel 28. The front forks 2 of the frame are attached to the rear frame 7 by means of the parallelogram arms 5, which can be moved by means of the operating device 13. Two slides 9 are attached to each of the front forks 2, and the rollers 3, 4 and their motors and gear-boxes are attached to them. The slides 9 are connected to one another by means of another operating device 10, by means of which they and the rollers 3, 4 with them can be moved longitudinally and the rollers can be compressed against the wheel 6 of the aircraft 1.

Hydraulic cylinders are used as the operating devices 10 and 13.

In FIG. 1 the transfer device has been driven around the double wheel 6 of an aircraft 1. The movement of the transfer device itself also takes place by means of friction transmission. If there is no aircraft wheel between the rollers 3, 4, the auxilliary friction rollers 11 on the opposite side of the slides 9 meet the support wheels 12, which can be rotated in a corresponding manner.

Figure 2:
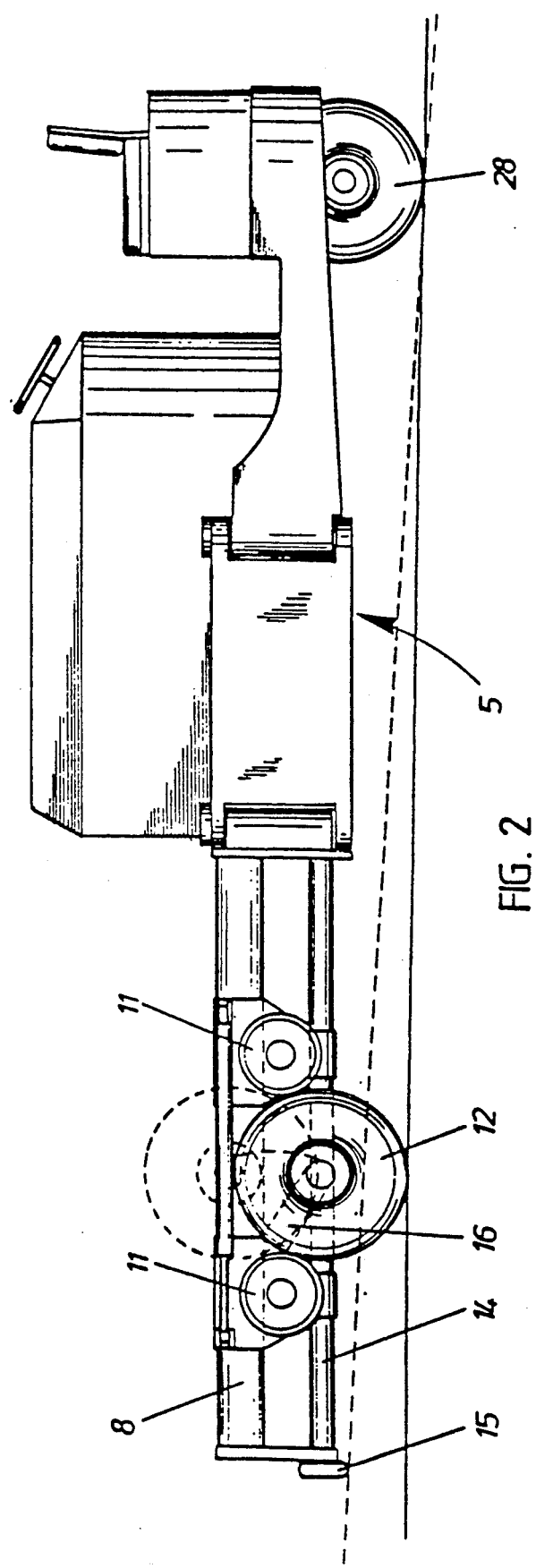
FIG. 2 shows the transfer device seen from the side
Figure 3:
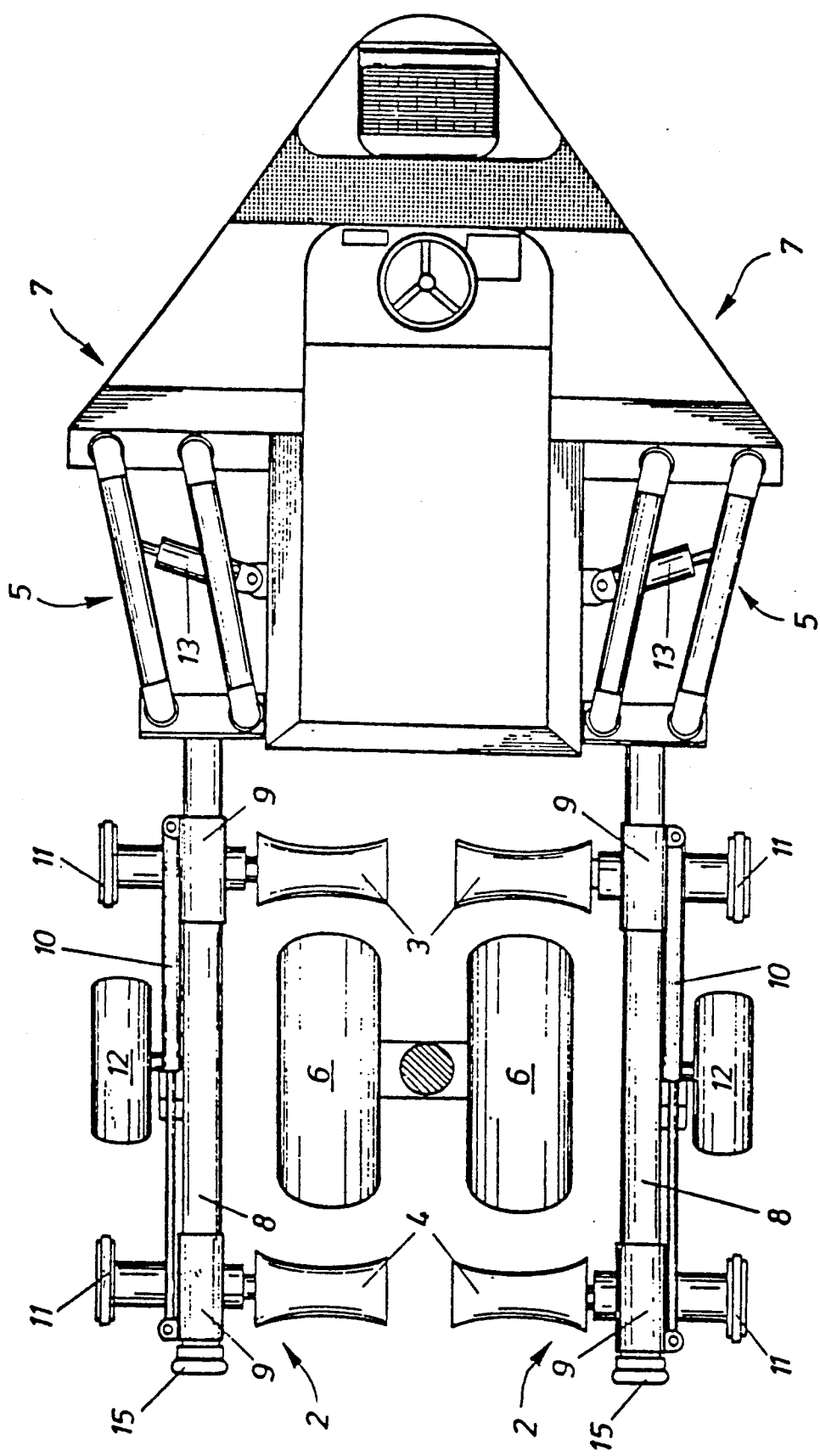
FIGS. 3 and 4 show the transfer device gripping a double wheel
Figure 4:
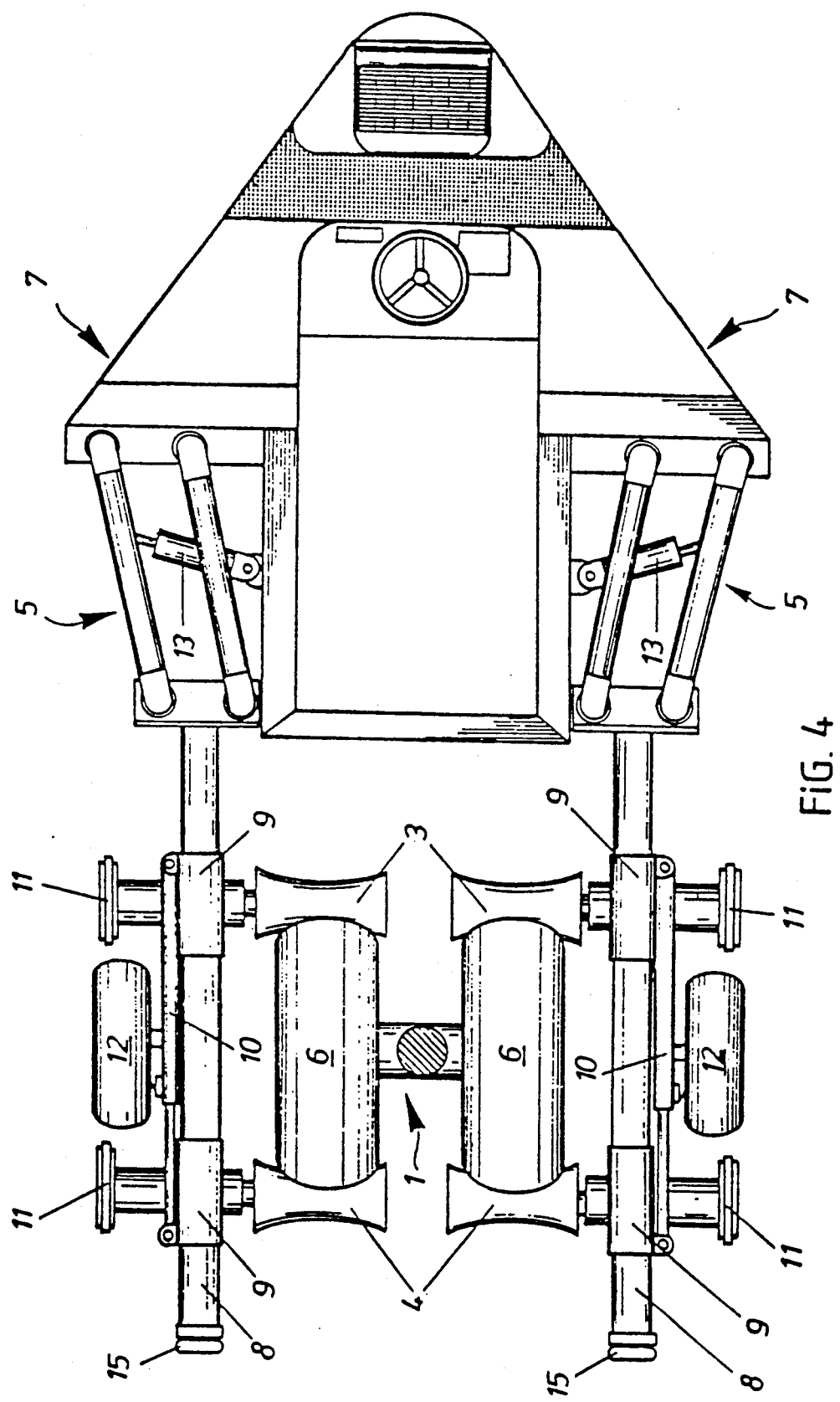

FIG. 2 shows the principle of the lateral movement of the forks 2. The forks 2 include two tubes 8 and 14, along which the slides 9 move. The support wheel 12 is supported by these tubes by means of the turning arm 16. This arm 16 can be turned and at the same time the support wheel 12 raised and lowered with the aid of a third operating device. When the support wheel 12 has been raised, the fork 2 descends onto the lateral auxiliary support wheel 15. After this the rollers 3 and 4 are pushed to their extreme positions and the forks 2 are drawn inwards, in order that the rollers are brought into line with the track of the double wheels 6, FIG. 3. The support wheel 12 is lowered to the ground and the rollers 3 and 4 are raised along with the fork 2. Finally the rollers 3 and 4 are drawn inwards to grip the wheel 6 and its rotation begins, FIG. 4. When the forks are being drawn open or closed it may happen that the second fork 2 does not begin to move at all. In that case the rollers 3, 4 of the fork 2 that has begun to move are brought round the corresponding wheel 6 and pressed tight, after which the rollers of the other fork 2 can also be brought into place. When moving in the opposite direction the support wheels 12 can be separately lowered to the ground.

Figure 5:
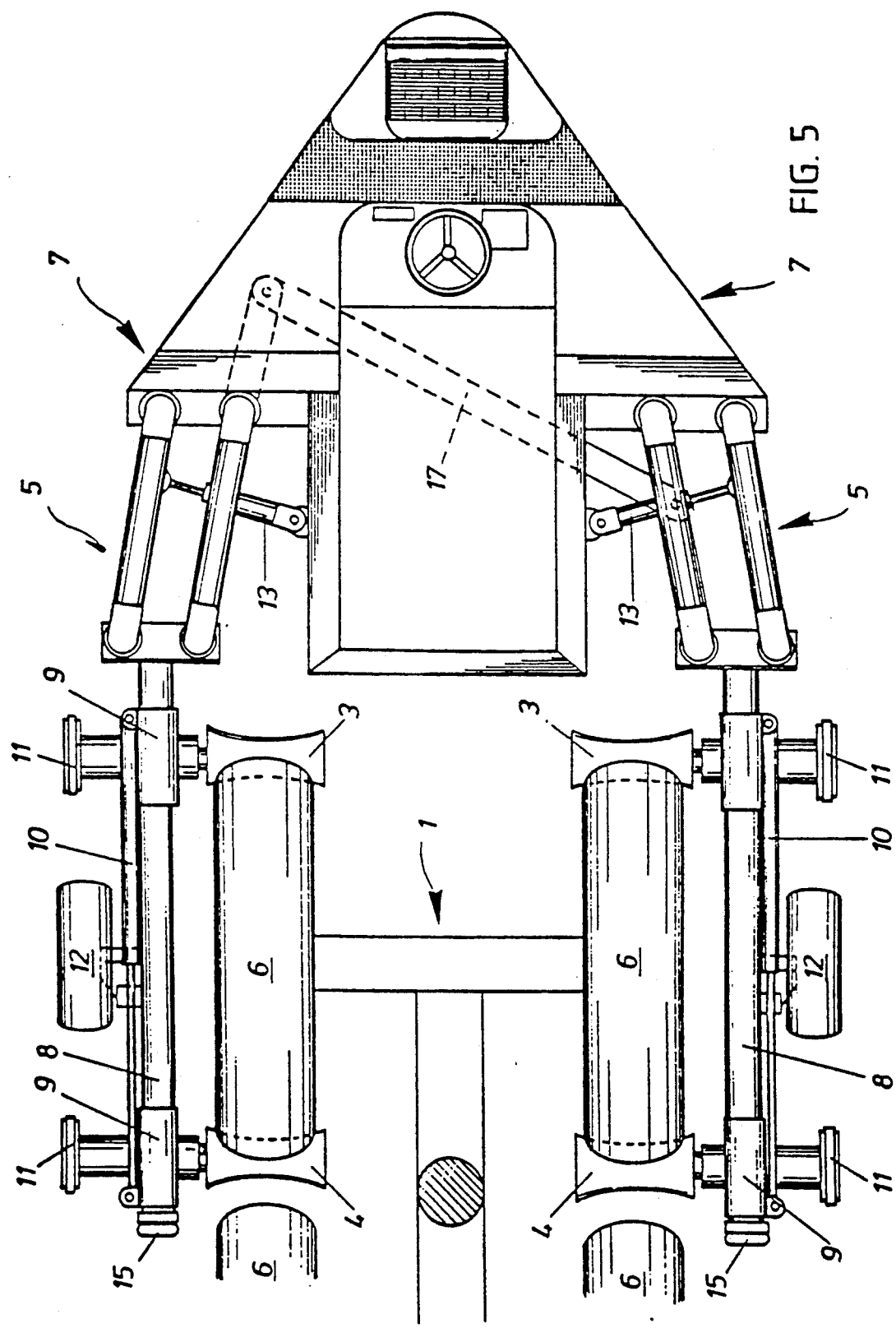
FIG. 5 shows the use of the transfer device in connection with large double wheels

The transfer device in FIG. 5 is shown in connection with a large-wheeled bogie. In the case of the wheels of a bogie two wheels next to each other form a double wheel, which is gripped by the transfer device. By turning the parallelogram arms 5 quite large differences in the sizes of double wheels can be dealt with. The movements of the parallelogram arms 5 can be synchronized by means of a transverse reaction rod 17.

The entire transfer device can form an extra implement to some suitable vehicle, for example a tractor, in which case it requires no separate power source. The vehicle is then technically regarded as being part of the transfer device.

Figure 6:
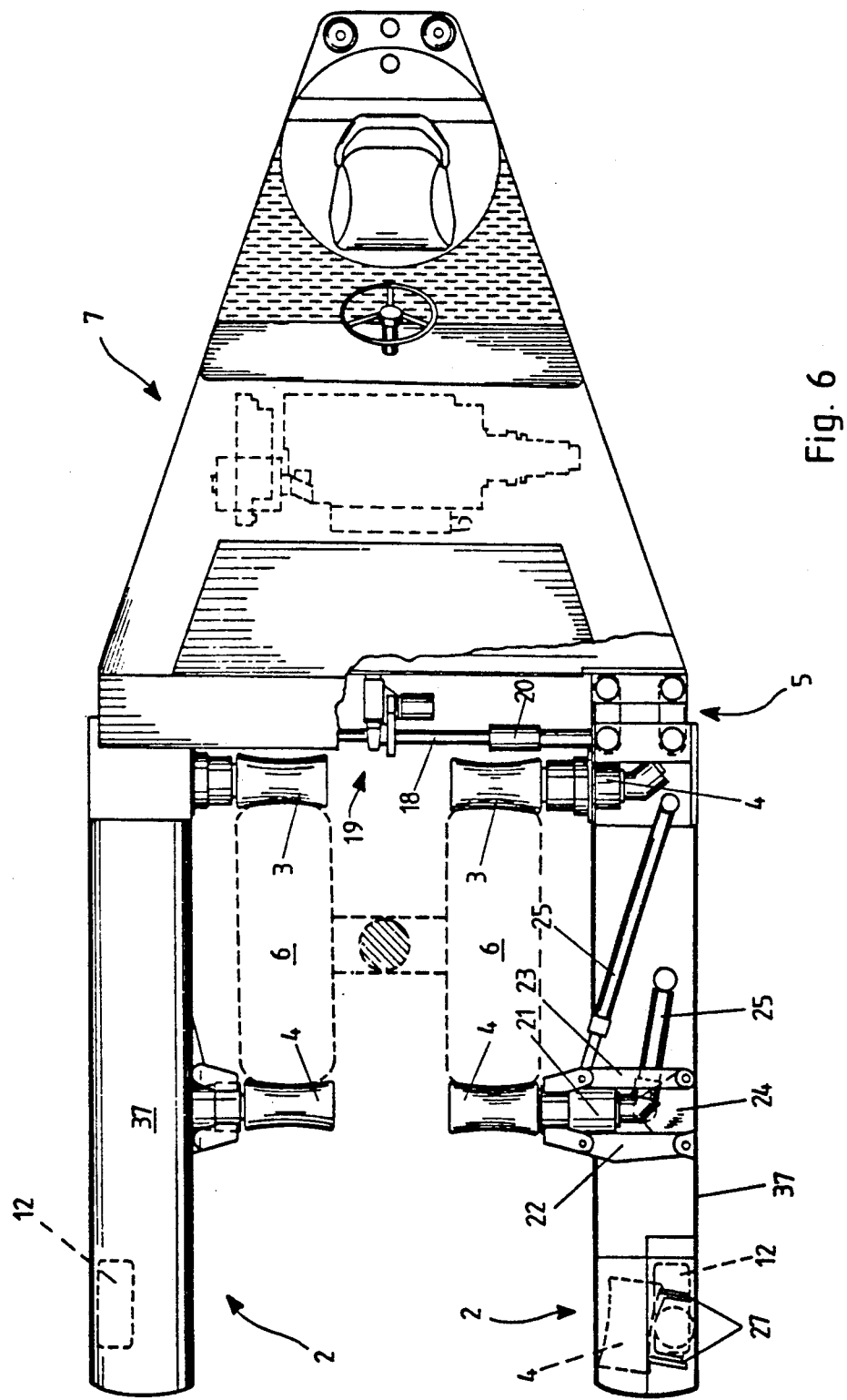
FIG. 6 shows one other transfer device seen from above
Figure 7:
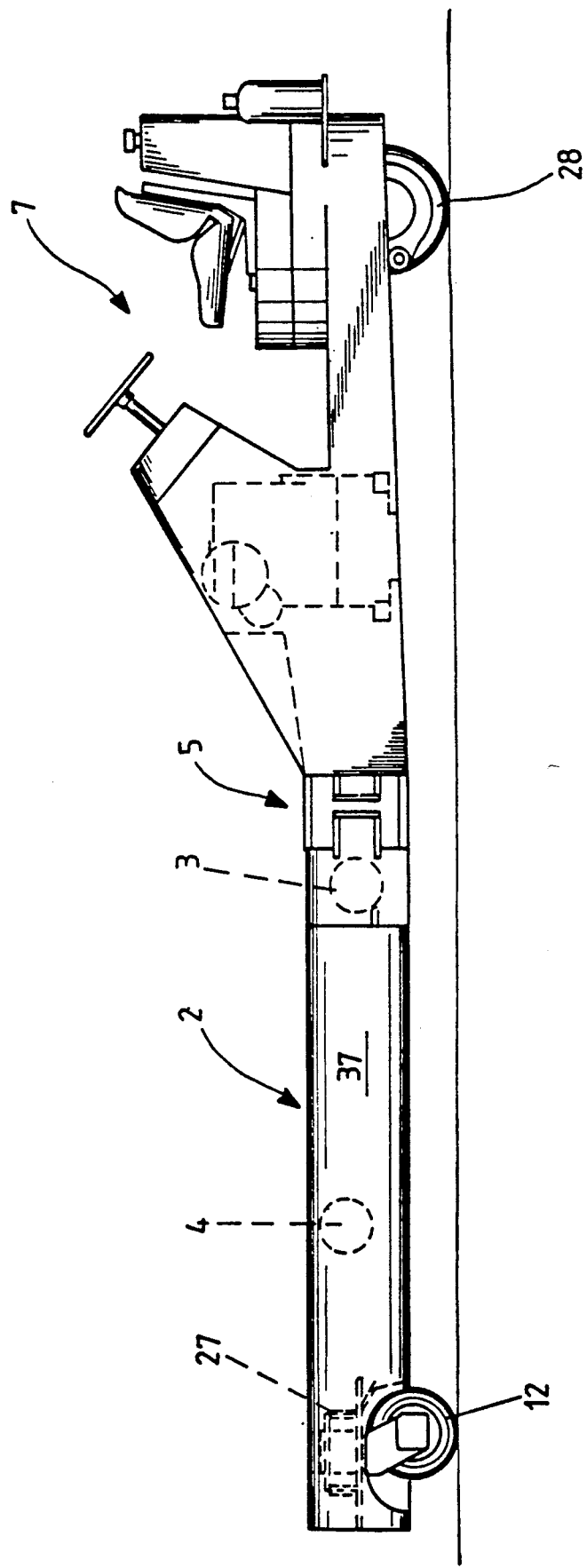
FIG. 7 shows the transfer device in FIG. 6 seen from the side

In the transfer device shown in FIGS. 6 and 7 the lateral movement of the parallelogram arms is much less than in the devices shown in FIGS. 1 through 5. This is because the front friction rollers 4 swing forwards and the lateral movement only adapts the transfer device to different kinds of bogies. In FIG. 6 one fork is shown in partial cross-section, so that the mechanism used to move the front friction roller 4 is visible.

The transfer device shown in FIG. 7 is formed principally of a rear frame 7 and the forks 2, attached to it by means of the parallelogram arms 5, to which the rollers are attached. Freely turning wheels 12 are located at the front of the forks 2, but however these are locked in place when the transfer device is being moved by the front friction roller 4 (shown by broken lines), which presses on a counter member 27 on the turning axle of the wheels 12. The transfer device then moves powered by the rotation device that belongs to the rear wheel 28.

The compression movement of the front friction rollers 4 takes place by means of swinging the parallelogram arms 22 and 23. The compression is controlled with the aid of a hydraulic cylinder 25. The friction roller 4 is swung to the front in such a way that the triangular plate 24 carried by the rear parallelogram arm 23 is swung forwards when the entire parallelogram is swung through about 85°. The swinging of this roller as such may be effected by also using other previously known mechanisms.

When moving an aircraft the front support wheels 12 turn freely, which makes it possible for the aircraft to be turned sharply. In this the forks 2 are principally constructed around the tube 37 in such a way that suitable opening to permit the movements of the friction rollers 4 are made in the tube, and the tube 37 itself forms a support frame for the attachment of various components. Here all four friction rollers are equipped with a hydraulic motor-reduction gear unit 21.

In this the lateral movement of the fork parts 2 is carried out with the aid of a threaded rod 18, which pulls or pushes the counter members 20 in the fork parts. The rotation of the screw 18 takes place by means of a hydraulic rotation device 19, which is supported laterally from the rear frame 7. Two advantages are gained here through the use of screw members. Firstly the movement of both forks is synchronized and secondly the screw transmission is self-retaining.

I claim:

1. A transfer device that grips a double wheel which is intended to move an aircraft (1) or any other double wheeled device equipped with a base, which transfer device consists of a fork-shaped frame and a pair of front and rear rollers (3, 4) attached to each of a pair of forks (2), means for compressing and moving the forks and means for revolving the rollers, and in which both pairs of rollers (3, 4) can be placed in front of and behind a wheel (6) of the double wheeled device (1) to be moved, and in which by rotating the rollers (3, 4) pressed against the wheels (6) of the double wheeled device to be moved the double wheels too are made to rotate and the entire double wheeled device is made to move, characterized in that the forks (2) are attached to a connecting rear frame (7) by means of parallelogram arms (5), which are adapted to provide at least a portion of the lateral movement required when placing the rollers (3, 4) around the double wheels (6) and which transfer device also includes means (13, 18, 19, 20) for swinging the parallelogram arms.

2. A transfer device in accordance with claim 1, characterized in that both of the forks (2) include two tube guides (8, 14) and a slide adapted to said tube guides, which are operated by an operating device (10), to which said pair of rollers (3, 4) and an operating motor is attached, such that operating device (10) moves the rollers and presses said rollers longitudinally against the wheel (6) to achieve compression.

3. A transfer device in accordance with claim 1, further comprising a synchronization member between the parallelogram arms (5), by means of which the arms swing by an equal amount.

4. A transfer device in accordance with claim 1, further comprising a raiseable support wheel (12) and a laterally placed auxilliary support wheel (15), on which the forks (2) can be moved in a lateral direction.

5. A transfer device in accordance with claim 1, further comprising means (21, 23, 24, 25, 26) for swinging the front friction rollers (4) away from the track of the wheel (6) of the double wheeled device to be moved and back in front of said wheel.

6. A transfer device in accordance with claim 5, which includes a rear wheel turned by steering devices and rotated by a power device, the front ends of the forks (2) further comprising support wheels (12) made to turn freely, a turning axle of which includes a counter member (27) against which the friction rollers (4) can swing and lock both support wheels (12) in a fixed direction.

7. A transfer device in accordance with claim 1, wherein said means for swinging said parallelogram arms comprises a power screw, having a threaded rod (18), counter parts (20), and a rotating device, the threaded rod being locked in the centre in a lateral direction, to the rear frame (7) of the transfer device.

8. A transfer device in accordance with claim 2, further comprising a reaction rod (17) or any other synchronization member between the parallelogram arms (5), by means of which the arms turn by an equal amount.

9. A transfer device in accordance with claim 2, characterized in that both forks include a support wheel (12) and that the setting of the support height of the forks in relation to the support wheel and the front end of each fork (2) takes place through a laterally placed auxiliary support wheel (15), on which the forks (2) can be moved in a lateral direction, once the support wheel (12) has been raised.

10. A transfer device in accordance with claim 3, characterized in that both forks include a support wheel (12) and that the setting of the support height of the forks in relation to the support wheel and the front end of each fork (2) takes place through a laterally placed auxiliary support wheel (15), on which the forks (2) can be moved in a lateral direction, once the support wheel (12) has been raised.

11. A transfer device in accordance with claim 2, wherein the operating device of the parallelogram arms comprises a power screw, the principal components of which are a threaded rod (18) counterparts (20), and a rotating device, the threaded rod being locked in the centre in a lateral direction to the rear frame (7) of the transfer device.

12. A transfer device in accordance with claim 5, wherein the operating device of the parallelogram arms comprises a power screw, the principal components of which are a threaded rod (18) counterparts (20), and a rotating device, the threaded rod being locked in the centre in a lateral direction to the rear frame (7) of the transfer device.

13. A transfer device in accordance with claim 6, wherein the operating device of the parallelogram arms comprises a power screw, the principal components of which are a threaded rod (18) counterparts (20), and a rotating device, the threaded rod being locked in the centre in a lateral direction to the rear frame (7) of the transfer device.

14. A transfer device that grips a double wheel, which is intended to move an aircraft (1) or any other double wheeled device equipped with double wheels on a base, which transfer device consists of a rear frame (7), a pair of forks (2), and a pair of rollers (3, 4) attached to both of said forks (2), means for compressing and moving the forks and means for revolving the rollers, and in which both pairs of rollers (3, 4) can be placed in front of and behind a wheel (6) of the double wheeled device (1) to be moved, and in which by rotating the rollers (3, 4) pressed against the wheels (6) of the double wheeled device to be moved, the wheels (6) are made to rotate and the entire doubled wheeled device is made to move, said transfer device comprising:

a. parallelogram arms (5) connecting said forks (2) to said rear frame (7) so as to effect lateral movement of said forks (2) when placing the rollers (3, 4) around the double wheels; and b. means for turning the parallelogram arms.

* * * * *